United States Patent [19]
Saiia et al.

[11] 3,910,016
[45] Oct. 7, 1975

[54] GANG LAWN MOWER

[75] Inventors: Anthony J. Saiia, South Milwaukee; Donald G. Haffner, Glendale; Knud H. Hoffmeyer, Racine, all of Wis.

[73] Assignee: Jacobsen Manufacturing Company, Racine, Wis.

[22] Filed: Aug. 8, 1974

[21] Appl. No.: 495,635

[52] U.S. Cl. .................................... 56/7; 56/15.3
[51] Int. Cl.² .................................... A01D 35/24
[58] Field of Search .......... 56/7, 6, 15.2, 15.3, 15.9, 56/17.1, 13.6

[56] References Cited
UNITED STATES PATENTS

| 3,668,844 | 6/1972 | Akgulian | 56/7 |
| 3,824,772 | 7/1974 | Sorenson et al. | 56/7 |

*Primary Examiner*—J. N. Eskovitz
*Attorney, Agent, or Firm*—Arthur J. Hansmann

[57] ABSTRACT

A gang lawn mower having a tractor with a frame and having mowers connected with the frame and a prime mover for driving the tractor and the mowers. Pivot mounting members are connected with the frame for pivotally supporting the mowers thereon, and there are two mowers arranged in end-to-end relation with a pusher member extending thereto for propelling the mowers and for pivotally supporting the mowers. A spring counterbalance arrangement extends between the frame and the pusher member for supporting the weight of the two mowers, and there is another mower disposed rearwardly and in the cutting path between the two mowers. Adjustment members extend to all mowers for adjusting the angle of cut, and the drive connections to the mowers are of a flexible nature so that the mowers can pivot and be adjustable and still be driven in those various positions. The drive to the front two mowers extends adjacent the pusher member, and springs are attached to the front two mowers for counterbalancing the weight at the outer ends of the front two mowers.

8 Claims, 6 Drawing Figures

GANG LAWN MOWER

This invention relates to a gang lawn mower, and, more particularly, it relates to a gang lawn mower wherein a plurality of mowers are supported on a tractor and can be pivotally positioned up and down relative to the tractor and the mowers can be adjusted in their positions relative to the tractor for altering the height of cutting.

BACKGROUND OF THE INVENTION

Gang lawn mowers are commonly known and exist in many forms in the prior art. In these instances, the concern and problem is to provide the mounting and support for the mowers, on a tractor or the like, so that the mowers can efficiently cut the grass and yet not be unduly complex and heavy so that they lose the maneuverability required in a gang lawn mower. That is, it is desirable that a gang lawn mower have the mowers pivotally mounted, and the mowers should also be adjustable with regard to cutting height, and the pivot position of the mowers should be such that the mowers are self-adjusting relative to ground elevation and thus they will ride over uneven and hilly ground.

The present invention achieves the aforementioned desirable designed characteristics, and it is therefore a primary object of this invention to provide a gang lawn mower which efficiently and neatly mows the grass but without requiring a complex and expensive gang mower or machine.

More specifically, it is an object of this invention to provide a gang lawn mower wherein the mowers are mounted on a tractor for up and down pivotal movement to thereby be self-adjusting to the ground elevation, and to have the mowers adjustable for selectable cutting height of the grass. In accomplishing this objective, the mowers of this invention are powered in that the mowers of the gang mowers of this invention are powered by the prime mover of the tractor, and yet the drive connection to the mowers is not affected by the pivotal action of the mowers in their self-adjusting to the ground elevation.

Another and more specific object of this invention is to provide a gang lawn mower wherein at least some of the mowers are counterbalanced so that the full weight of the mower is not supported on the ground, and thus the mowers can be positioned and maintained in position for easy and efficient and accurate mowing of the grass.

Other objects and advantages have become apparent upon reading the following description in light of the accompanying drawings.

BRIEF DESCRIPTION OF THE DRAWINGS

FIG. 6 is an enlarged top perspective view of the fragment of the front end of the gang mower shown in FIG. 3.

DETAILED DESCRIPTION OF THE PREFERRED EMBODIMENT

Figure 1:
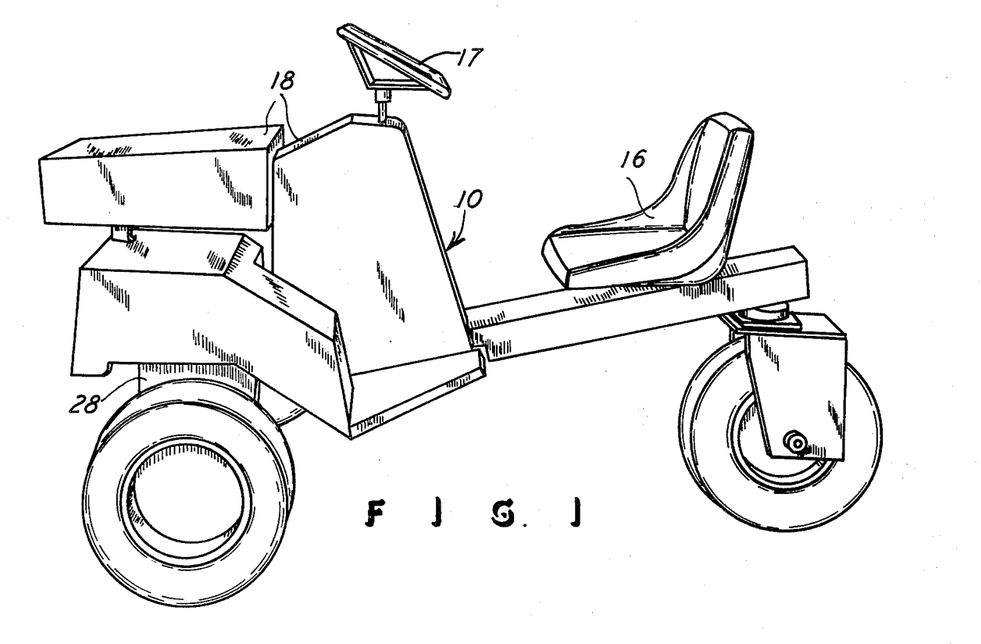
FIG. 1 is a side perspective view of the tractor utilized in this gang mower, and with the mowers removed.
Figure 2:
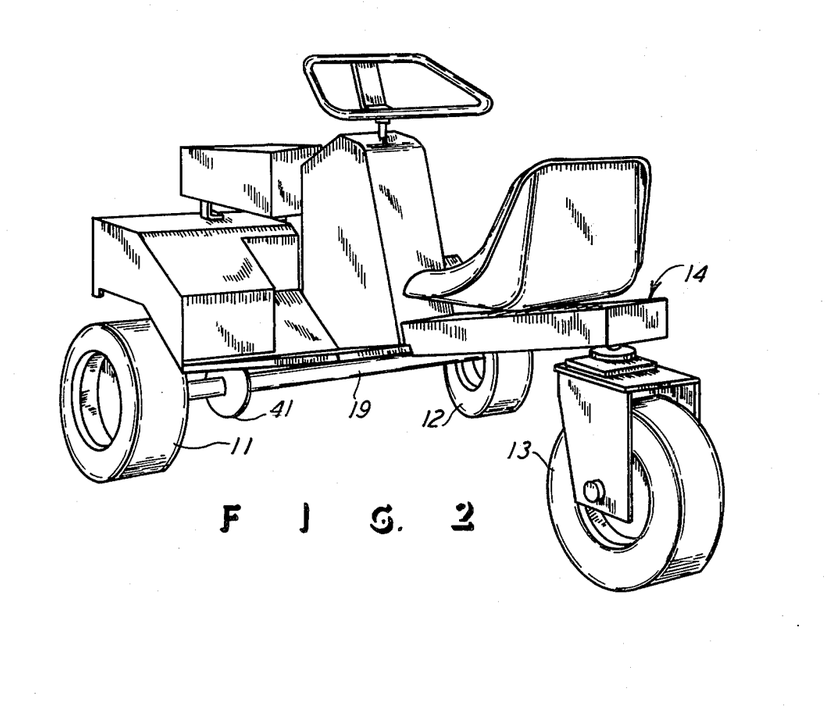
FIG. 2 is a rear perspective view of FIG. 1.
Figure 3:
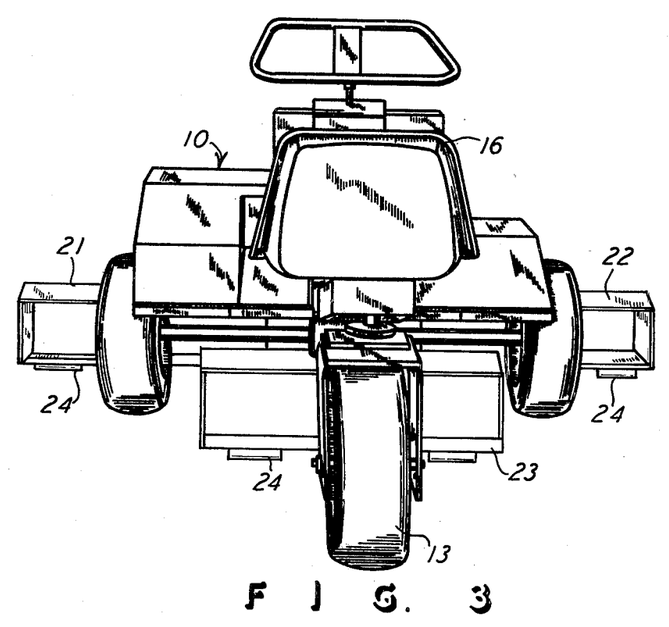
FIG. 3 is a rear perspective view of the tractor of FIG. 1 and with the mowers added thereto.

FIGS. 1, 2, and 3 show the tractor, generally designated 10, and it includes two forwardly located engaging wheels 11 and 12 and one rear wheel 13, and it includes a frame, generally designated 14. The tractor also includes an operator's seat 16, a steering wheel 17, and tractor body members 18, and a front axle member 19. The particular construction and configuration of the tractor is not included as a part of this invention, and the tractor is therefore presented only as shown in FIG. 1, 2, and 3, except for the additional showing of the tractor parts in the other drawings. It will of course be understood that the tractor is a riding type, and it has the three ground engaging wheels shown. Further, FIG. 3 shows a plurality of mowers supported by the tractor 10, and there are two forwardly disposed mowers 21 and 22 and one rearwardly disposed mower 23. These mowers are of a substantially conventional reel type, and it will of course be readily understood by anyone skilled in the art that these three mowers have cutting reels and bed knives and the like to make them conventional and operable reel mowers. Further, it will be seen and understood that the two forwardly disposed mowers 21 and 22 are disposed in end-to-end relationship, that is, side-by-side, and the third mower 23 is disposed rearwardly of the two forward mowers and is disposed in the cutting path between the two mowers 21 and 22, and thus the three mowers cut one wide swath in the usual manner of arranging three mowers on a tractor, and as will be readily seen and understood by one skilled in the art. The three mowers have ground engaging members, such as the skids 24, and these skids are disposed for sliding over the ground and are disposed rearwardly of the respective mowers, and thus the mowers can be adjusted in their cutting heights, by pivoting the mowers on the skids 24, in a manner which will be more apparent and more fully described later.

Figure 4:
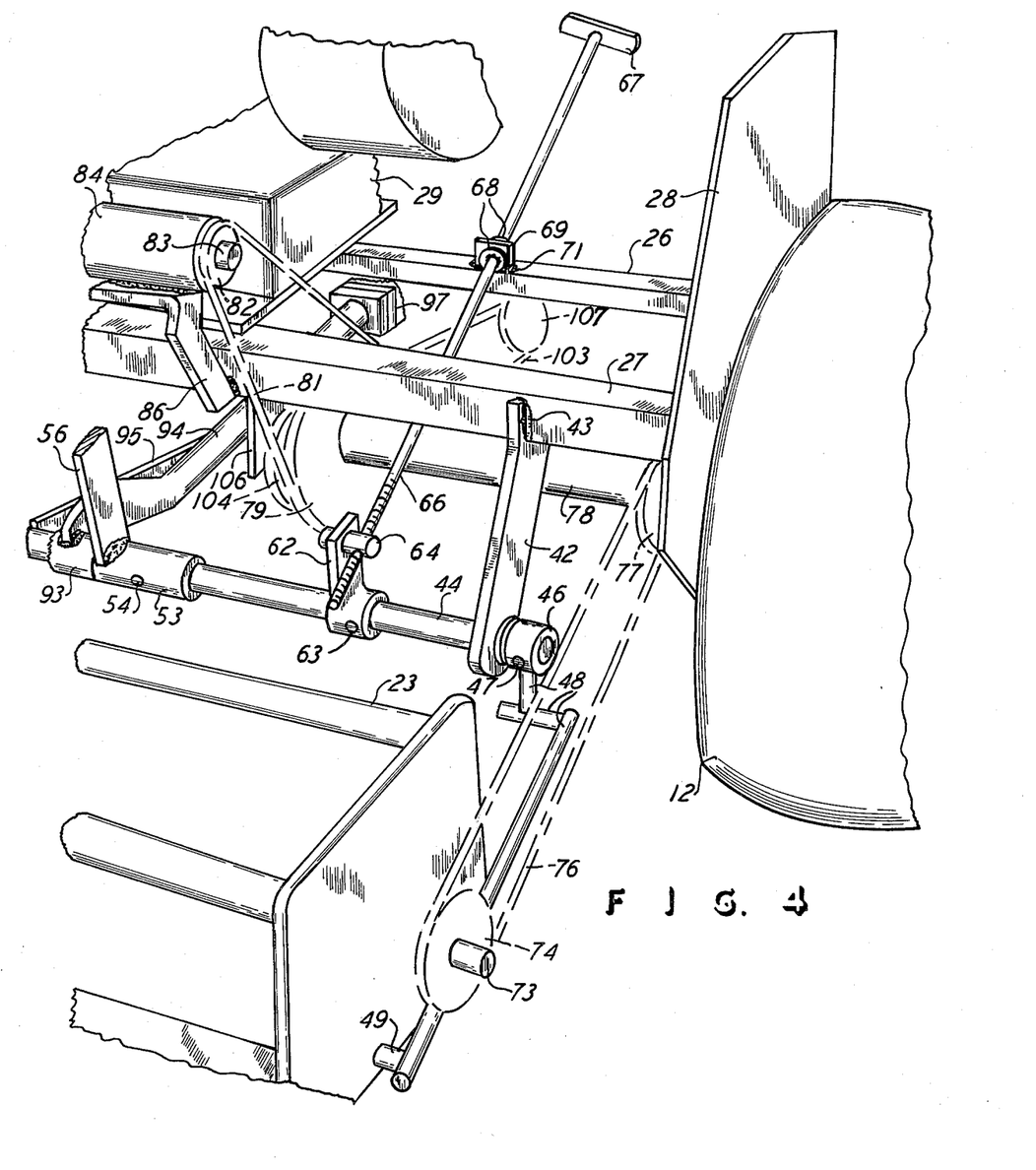
FIG. 4 is an enlarged rear perspective view of a fragment of the gang mower shown in FIG. 3, with parts added thereto.
Figure 5:
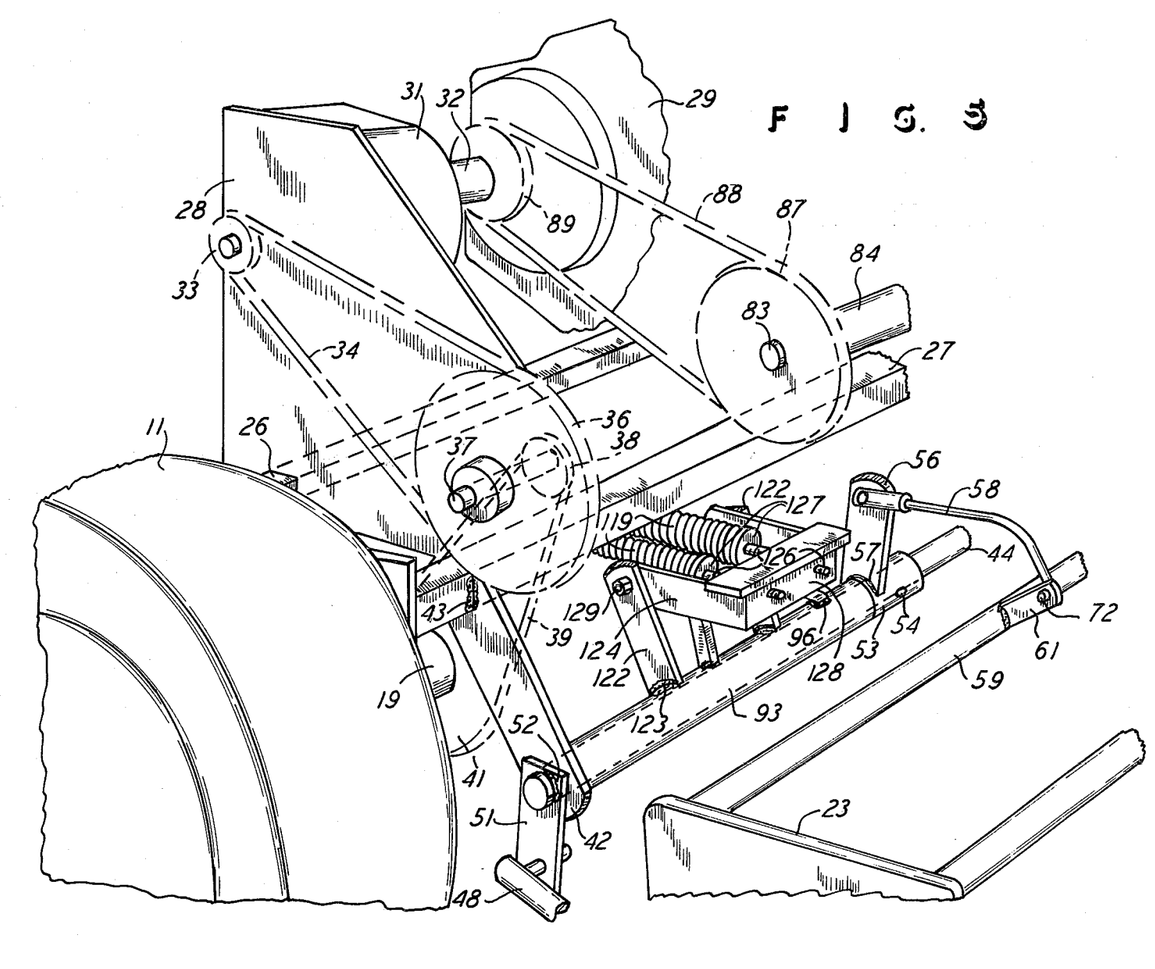
FIG. 5 is an enlarged rear perspective view of a fragment of the gang mower shown in FIG. 3.
Figure 9:
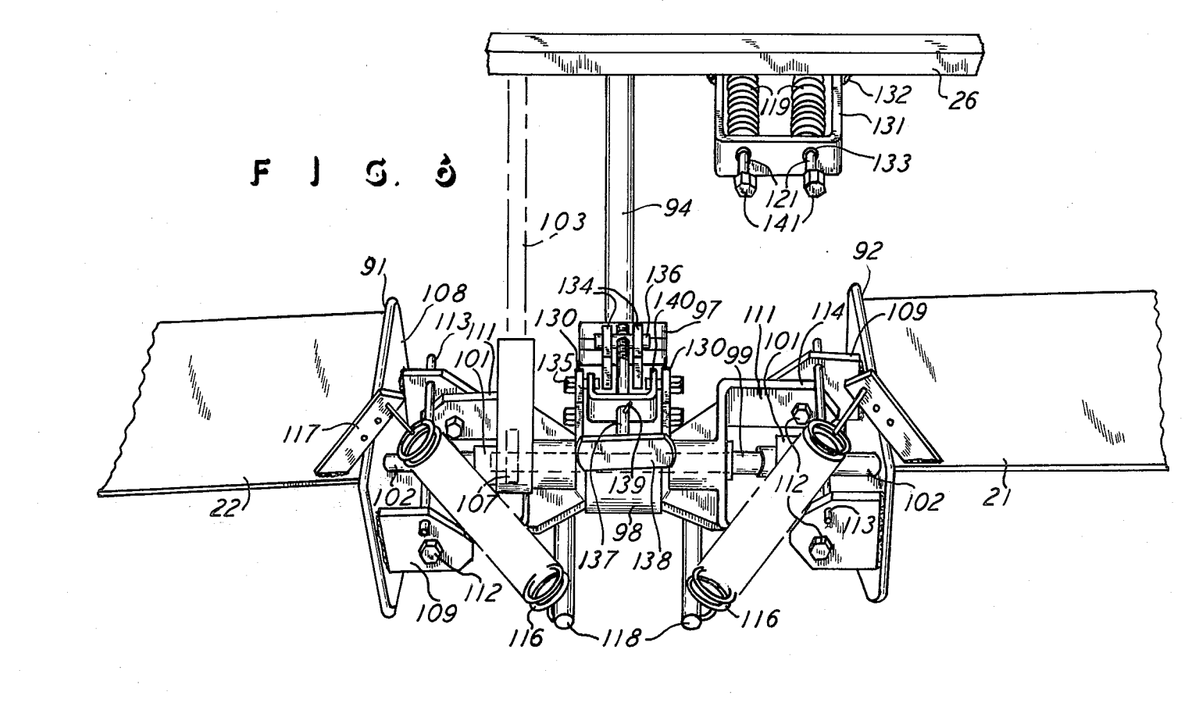

FIGS. 4, 5, and 6 show the tractor frame to include two beams 26 and 27 which extend transverse to the tractor fore-and-aft axis and are spaced apart and have their opposite ends joined by frame members, such as the upright plates 28. It will be further understood that a prime mover, such as a gasoline engine indicated at and designated by reference 29 is supported on the frame members 26 and 27, and the prime mover provides the traction power for the tractor 10 and it also powers the reels of the reel-type mowers 21, 22, and 23 in a manner hereinafter described.

The engine 29 is shown to be in driving relation with a power transmitting member designated 31, and this member may be a power transmission of any conventional construction, such as a hydraulic type, and the connection from the engine to the member 31 may be through the engine shaft 32, as seen in FIG. 5. A sprocket 33 is drivingly connected to the member 31 and is shown in dot-dash lines, and a sprocket chain 34 extends to a larger sprocket 36, and both are shown in dot-dash lines, and the sprocket 36 is mounted on a shaft 37 which is suitably rotatably supported off the tractor frame and which in turn supports a smaller sprocket 38 which engages a chain 39 which in turn is in driving relation with a sprocket 41 which is on the tractor axle 19. The drive train of sprockets and chains described and numbered 33 to 41 is generally shown in dot-dash lines, for simplicity of showing and for clarity thereof, and this drive exists for the traction power of the tractor, and it may be of any conventional arrangement, such as that described, and it therefore need not be further described for a complete description of this invention.

The three mowers are supported from the tractor frame, and specifically the mowers are supported on the frame cross member 27 through a pair of arms 42 which are welded at 43 to the member 27, and the lower ends of the arms 42 rotatably support a shaft 44 which is thus disposed with its longitudinal axis transvers of the fore-and-aft axis of the tractor and in a horizontal disposition. FIG. 4 shows the rear mower 23 attached to the shaft 44 by means of a sleeve 46 secured to the end of the shaft 44 through a set screw 47 so that the member 46 and the shaft 44 rotate in unison, and linkage designated 48 is connected with the member 46 and extends to a connector 49 on the mower 23 to thus pivotally attach to the mower 23 and thereby connect with the mower for the forward movement or thrust of the mower 23 off the tractor 10. The actual connection through the linkage 48 and the connector 49 may be of any conventional arrangement, and FIG. 5 shows that there is a depending arm 51 which is attached to the shaft 44, such as by welding at 52, and thus the arm 51 rotates with the shaft 44 and connects to the linkage 48 to extend rearwardly to the left side of the mower 23 in the manner in which the connection is shown in FIG. 4. Also, a sleeve 53 extends over the shaft 44 and is affixed to the shaft to rotate therewith by means of a set screw 54. An upstanding arm 56 is welded at 57 to the sleeve 53, and a link 58 pivotally connects to the arm 56 and to a cross member 59 through an arm 61 on the mower 23, as shown in FIG. 5. Another upstanding arm 62 is secured to the shaft 44 by means of a set screw 63, and thus the shaft 44 and arm 62 rotate together, and the arm has a threaded member 64 which engages a threaded rod 66 extending forwardly of the gang mower and terminating in a forwardly disposed handle 67. Two washer-like members 68 are affixed to the threaded rod 66 and they engage a bracket 69 welded at 71 to the frame member 26, and thus the rod 66 can rotate in the guide or bracket 69 and the rod rearward and threaded end will advance relative to the threaded member 64 and thus displace the arm 62 and consequently rotate the shaft 44. Rotation of the shaft 44 will displace the connecting link 58 and thus pivot the mower 23 about its ground supports or skids 24, and thus the cutting height of the mower 23 can be adjusted.

It will be further seen and understood that the mower 23 can be raised, and it will actually move up and down in response to irregularities in the ground being traversed, and such up and down motion is permitted by the articulated linkage 48 and the pivot connection at 72 of the connecting link 58, and thus the linkage 48 is suitably conventionally pinned together or joined in its several branches shown in FIG. 4, and thus the up and down motion of the mower 23 is achieved even though the rod 44 is not pivoted or rotated about its longitudinal axis, and this arrangement is substantially conventional with regard to the linkage 48. Further, the rear mower 23 has its driven shaft designated 73 engaged by a sprocket 74 which has a chain 76 thereon and which extends to engage a sprocket 77 on a support member 78 on the tractor 10. The sprocket 77 is suitably conventionally driven through a drive train which includes a sprocket 79 on the end of the rotatable member 78 which is rotatably supported on the tractor 10, and a sprocket chain 81 is on the sprocket 79 and is driven by a sprocket 82 on a shaft 83 supported from a housing 84. A bracket 86 is suitably affixed to the member 27 and fixedly supports the member 84, as shown in FIG. 4, and FIG. 5, shows the member 84 includes the shaft 83 which has a sprocket 87 thereon and the sprocket 87 is driven by a sprocket chain 88 which in turn is driven off the sprocket 89 rotated by the engine 29, all in a conventional arrangement.

Therefore, the drive to the rear mower 23, as just described, is such that the mower 23 can move up and down while it is mowing, and the drive is in the nature of a flexible or adjustable drive, by virtue of the location of the sprockets 77 and 74 and the intervening chain 76, so that the drive to the mower 23 can continue even though the mower 23 is moving up and down. That is, the sprocket 77 is located relative to the horizontal or longitudinal axis of the shaft 44, relative to which the mower 23 is actually moving up and down, as described, but the up and down movement is within the range of movement of the sprocket chain 76, by virtue of the geometry of the drive train just described.

The gang mower has the two forward mowers 21 and 22 in end-to-end or side-by-side relation, as seen in FIGS. 3 and 6, and these mowers are supported from and connected with the tractor frame member 27 in the manner hereinafter described. FIG. 6 therefore shows the mower inner ends 91 and 92 in the end-to-end relationship with the space therebetween, and the mower 23 is disposed in the path of that space described and shown, in the usual arrangement of three mowers in a gang. FIGS. 4 and 5 show that the shaft 44 has a long sleeve 93 rotatable thereon, and a pusher member or arm 94 is affixed to the sleeve 93 by welding at 96, and the member 94 extends forwardly of the sleeve 93 in substantially a horizontal orientation, and FIG. 4 shows the member 94 has a forwardly disposed block 97 which is also seen in FIG. 6. A brace 95 is also suitably affixed to the sleeve 93 and to the side of the pusher member 94, to laterally support the member 94 relative to the fore-and-aft axis of the tractor and thereby give the member 94 sufficient stability for pushing forwardly on the front mowers 21 and 22. With this arrangement, all of the forward thrust to the mowers 21 and 22 is achieved through the pusher member 94.

FIG. 6 shows that the member 97 terminates in a forwardly disposed end 98, and a shaft 99 is rotatably supported in the member 98 and extends thereacross and into conventional type of universal joints 101 on each end of the shaft 99, and the joints 101 in turn connect to the shafts 102 of the mowers 21 and 22, and such connection is substantially conventional and of course permits the mowers 21 and 22 to articulate, while being driven, relative to the driving shaft 99. The actual universal connection 101 may be of a universal joint arrangement or it may be of a socket and square drive arrangement, both of which are commonly known, or it may be of any other conventional drive connection giving universal action. FIGS. 4 and 6 show a sprocket chain 103 which extends between a sprocket 104 on the member 78 which is supported on a bracket 106 and also on the side frame member 28, for instance, and the chain 103 extends to the sprocket 107 which is in driving relation on the shaft 99. It will again be seen and understood and now mentioned that the drive trains described with regard to the traction power of the tractor 10 and with regard to the driving of the three mowers, for convenience and simplicity and also clarity, the drive train members are shown in dot-dash lines in the drawings.

Each mower 21 and 22 has an end plate 108 which has two spaced-apart ears 109 affixed thereto, and a bifurcated member 111 is pivotally connected with the ears 109 by means of the bolts 112. The members 111 are supported on the member 98 through the shaft 99, and thus the members 111 can actually rotate relative to the axis of the shaft 99. Also of course the outer ends of the mowers 21 and 22 can pivot up and down, relative to the respective axis of the pivot bolts 112. Further, each mounting support for the mowers 21 and 22 has a rod 113 which extends between the members 109 and the rod 113 bears downwardly on the upper edges 114 of the members 111 to thus limit the amount of downward pivot of the outer ends of the mowers 21 and 22 about the pivot bolts 112, and thereby connecting mechanism between the pusher 94 and the mowers 21 and 22 is provided. Additionally, each mounting has a tension spring 116 which connects between an arm 117 on each mower 21 and 22 and to a member 118 affixed to the member 111. Thus the springs 116 will yieldingly urge the outer ends of the mowers 21 and 22 upwardly and will thereby support the outer ends of the mowers 21 and 22.

At this point it will therefore be understood that the pusher member 94 exerts a forward force on the block 97, and in turn the members 111 are pushed forwardly and they transmit the forward thrust to the mowers 21 and 22 through the ears 109. In this arrangement, the mowers 21 and 22 can pivot about the longitudinal axis of the shaft 99, and the mowers can also pivot up and down about the axis of the pivot bolts 112, as described. FIGS. 5 and 6 show that the mowers 21 and 22 are resiliently urged upwardly by means of compression springs 119 which extend in the fore-and-aft direction of the tractor and which have rods 121 extending through the springs 119. FIG. 5 shows that 2 arms 122 are affixed to the sleeve 93 by means of weldments 123, and the upper ends of the arms 122 support a box member 124 which threadedly receives the threaded ends 126 of the rods 121. Washer members 127 are affixed with the rod-threaded sections 126 and they abut the rear ends of the springs 119, and thus the amount of compression on the springs 119 can be adjusted by threaded rotation of the threaded ends 126 in and out of the threaded portion 128 of the box-shaped member 124. Also, the member 124 is pivotally supported by the arms 122, by means of the bolts 129. FIG. 6 shows that a U-shaped bracket 131 is affixed by means of welding 132 to the frame cross piece 26, and thus the forward ends of the springs 119 is limited by abutment with the member 131, but the rods 121 can slide through openings 133 in the member 131. With this arrangement, it will be seen and understood that the pusher member 94 can have its forward end, such as at the member 97, move up and down and thus the sleeve 93 will rotate. The downward movement is resisted by the force of the springs 119 which bear against the washers 127 and on the threaded support 128 through the rods 126 and thus tend to rotate the arms 122 upwardly from the FIG. 5 position. In this arrangement, the weight of the forward mowers 21 and 22 is counterbalanced by the springs 119. Further, the washer member 127 and their integral threaded rods 126 can be adjustably positioned relative to the support member 128, and thus the amount of force or tension in the springs 119, and thus the amount of lifting effect on the front mowers 21 and 22, can be regulated and adjusted. It is desired that the force be such that the mowers ride on the ground so that they will remain with the ground and move up and down in response to irregularities in the ground and thus smoothly and accurately mow the grass.

Again it will be noted that the drive to the front mowers 21 and 22, through the sprocket 104, chain 103, and sprocket 107, is such that the drive is deemed flexible and thus permit the up and down movement of the mowers while the drive is continuing and therefore the mowing action continues. This is achieved by virtue of the arrangement described and the fact that the drive train just described is flexible and is substantially pivoted about the sprocket 104 which is adjacent the axis of rotation of the sleeve 93 which is the axis of pivot for the mowers themselves.

FIG. 6 further shows the members 111 each have an upstanding plate 130 which receives a pivot bolt 135 which in turn pivotally connects to a U-shaped member 140. Also, the member 97 has two upstanding plates 134 which are affixed thereto and which support a threaded member 136. A threaded rod 137 has one end connected with the member 136 to thread therewith upon rotation of the rod 137, and the rod 137 has a handle 138, and the rod 137 extends through the member 140 to rotate thereon but to be axially fixed therewith, by means of the pin 139 on each side of the member 140. Thus, rotation of the rod 137 will move the rod relative to the threaded member 136, and correspondingly the flanges 130 affixed to the members 111 will move in the fore-and-aft direction and thereby adjust the cutting height of the mowers 21 and 22 by rotating the members 111 about the axis of the shaft 99, as the mowers 21 and 22 are pivoted about their ground engaging members such as the skids 24.

It will also therefore be seen and understood that the front mowers 21 and 22 have the drive connector chain 103 and sprocket 107 drivingly related to the shaft 99 and disposed between the axes of pivot of the bolts 112, and thus the mowers 21 and 22 can have their outer ends move up and down, and the entire front mower assembly, including the pusher member 97, can move up and down and the driver train will automatically adjust and the drive to the mowers will continue. Further, the weight of the front mowers 21 and 22 is counterbalanced by the springs 119. Additionally, any conventional means may be employed for lifting the mowers 21, 22 and 23 and putting them into the transport position as they are then suspended on the tractor 10, and such position is achieved without disconnecting or otherwise interrupting the articulated mounting connections described and also without disconnecting the drive trains to the respective mowers. It will also be seen and understood that the rods 121 have nuts or like stops 141 on the forward ends thereof for abutting the bracket 131 when the sleeve 93 is rotated to a position where its affixed arms 122 are at their maximum elevation, as they are seen in FIG. 5, and that therefore limits the upward movement of the mowers 21 and 22 and thereby limits their movement against a forward push through the member 94. In this arrangement, of course the compression springs 119 bear against the cross portion of the bracket member 131 and thereby present the resilient mechanism of the counterbalance described herein. The universal type connection at 101 may be the ball and socket type shown in FIGS. 15 and 16 of U.S. Pat. No. 3,410,063 which otherwise shows an older style of mower mounting and drive.

What is claimed is:

1. A gang lawn mower comprising a tractor having a prime mover and ground wheels and a frame, a plurality of lawn mowers with two thereof disposed in side-by-side relation and being articularly connected together at their adjacent inner ends thereof, a lawn mower attaching member rotatively supported on said frame rearwardly of said two mowers and presenting a rotation axis extending transverse to the fore-and-aft axis of said tractor, a pusher member connected to said attaching member to be rotatable therewith relative to said rotation axis and extending from said attaching member and toward said two mowers, said pusher member having an extending end disposed adjacent said two mowers, connecting mechanism interconnected with said two mowers and said extending end of said pusher member, and a resilient mechanism connected with said attaching member to yieldingly urge said attaching member about its said rotation axis in the direction tending to raise and extending end of said pusher member, and thereby tend to raise said two mowers and thus counterbalance the weight of said two mowers.

2. The gang lawn mower as claimed in claim 1, wherein said resilient mechanism includes a spring supported on said frame, an arm projecting on said attaching member for rotating said attaching member about its said rotation axis, and said spring being operatively connected with said arm for yieldingly rotating said attaching member to tend to raise said two mowers.

3. The gang lawn mower as claimed in claim 2, including an adjustable connection operatively connected between said spring and said arm for adjusting the force of said spring on said arm and thereby adjust the yielding rotative force on said attaching member.

4. The gang lawn mower as claimed in claim 1, wherein one of said plurality of lawn mowers is disposed rearwardly of said two mowers and in the cutting path therebetween, and pivot connections operatively connected between said frame and the rearwardly disposed said mower for pivotally mounting said mower on said tractor, and adjusting members connected between all said mowers and said frame for establishing the pivotal attitude of all said mowers on said frame.

5. The gang lawn mower as claimed in claim 1, including a drive connection operatively connected between said prime mover and said two mowers for powering said two mowers, and with said drive connection being flexible for powering said mowers in the various pivoted positions of said two mowers.

6. The gang lawn mower as claimed in claim 1, wherein said connecting mechanism includes a pivot connection for each of said two mowers for up and down pivotal movement of the outer ends of said two mowers, and a spring operatively associated with said pusher member and each of said two mowers for yieldingly upwardly supporting said outer ends of said two mowers.

7. The gang lawn mower as claimed in claim 6, including a rotation drive connection drivingly connected to said two mowers and being disposed between said pivot connections and thereby be spaced clear of said pivot connections, and a drive member operatively connected between said prime mover and said rotation drive connection and being flexible for powering said two mowers in the various pivoted positions of said two mowers.

8. The gang lawn mower as claimed in claim 1, including a shaft rotatably connected with said frame and extending transverse to the fore-and-aft axis of said tractor, said attaching member being a sleeve rotatably disposed on said shaft and supported thereby, an arm projecting on said sleeve for rotating said sleeve on said shaft, said resilient mechanism being operatively connected to said arm, a third one of said plurality of mowers being disposed rearwardly of said two mowers and in the cutting path between said two mowers, and articulated connections operatively attached between said shaft and said third mower for articularly connecting said third mower to said frame.

* * * * *

UNITED STATES PATENT OFFICE
CERTIFICATE OF CORRECTION

PATENT NO. : 3,910,016
DATED : October 7, 1975
INVENTOR(S) : Anthony J. Saiia, Donald G. Haffner, Knud H. Hoffmeyer It is certified that error appears in the above-identified patent and that said Letters Patent are hereby corrected as shown below:

In Claim 1, at column 7, line 30, change "and" to --said--.

Signed and Sealed this seventeenth Day of February 1976

[SEAL]

Attest:

RUTH C. MASON
Attesting Officer

C. MARSHALL DANN
Commissioner of Patents and Trademarks